United States Patent [19]

Seko et al.

[11] Patent Number: 4,604,611
[45] Date of Patent: Aug. 5, 1986

[54] SYSTEM AND METHOD FOR DETECTING DRIVER DROWSINESS INCLUDING DETECTION OF STEERING ROTATION AND REVERSAL

[75] Inventors: Yasutoshi Seko, Yokohama; Haruhiko Iizuka, Yokosuka; Takayuki Yanagishima, Yokosuka; Hideo Obara, Yokosuka, all of Japan

[73] Assignee: Nissan Motor Company, Limited, Japan

[21] Appl. No.: 580,175

[22] Filed: Feb. 15, 1984

[30] Foreign Application Priority Data

Feb. 18, 1983 [JP] Japan .................................. 58-24605

[51] Int. Cl.$^4$ ............................................ G08B 23/00
[52] U.S. Cl. ..................................... 340/576; 180/272; 340/575
[58] Field of Search ................. 340/576, 575; 180/272

[56] References Cited

U.S. PATENT DOCUMENTS

| | | | |
|---|---|---|---|
| 3,222,640 | 12/1965 | Wurst | 340/53 |
| 3,654,599 | 4/1972 | Sepper | 340/576 |
| 3,794,969 | 2/1974 | Klopfenstein et al. | 340/52 R |
| 4,005,398 | 1/1977 | Inoue et al. | 340/576 X |
| 4,058,796 | 11/1977 | Oishi et al. | 340/52 F |
| 4,104,621 | 8/1978 | Yanagishima et al. | 340/576 |
| 4,224,609 | 9/1980 | Yanagishima et al. | 340/576 |
| 4,450,438 | 5/1984 | Seko et al. | 340/576 |

FOREIGN PATENT DOCUMENTS

| | | |
|---|---|---|
| 0048492 | 3/1982 | European Pat. Off. |
| 0059225 | 9/1982 | European Pat. Off. |
| 0061500 | 10/1982 | European Pat. Off. |
| 2042853 | 3/1972 | Fed. Rep. of Germany |
| 2509354 | 9/1975 | Fed. Rep. of Germany |
| 2516675 | 10/1975 | Fed. Rep. of Germany |
| 57-57126 | 9/1982 | Japan |

Primary Examiner—James L. Rowland
Assistant Examiner—Jeffery A. Hoesass
Attorney, Agent, or Firm—Lowe, Price, Leblanc, Becker & Shur

[57] ABSTRACT

A system and method for detecting driver drowsiness in an automotive vehicle employs means for detecting changes in steering direction of a steering wheel on the basis of steering pulses, each steering pulse being produced whenever the steering wheel is rotated through a predetermined angle, and determines that the vehicle driver is drowsy when the number of steering pulses within a fixed interval of time exceeds a first reference value and the number of steering reversals within the fixed interval of time is below a second preset reference value.

14 Claims, 21 Drawing Figures

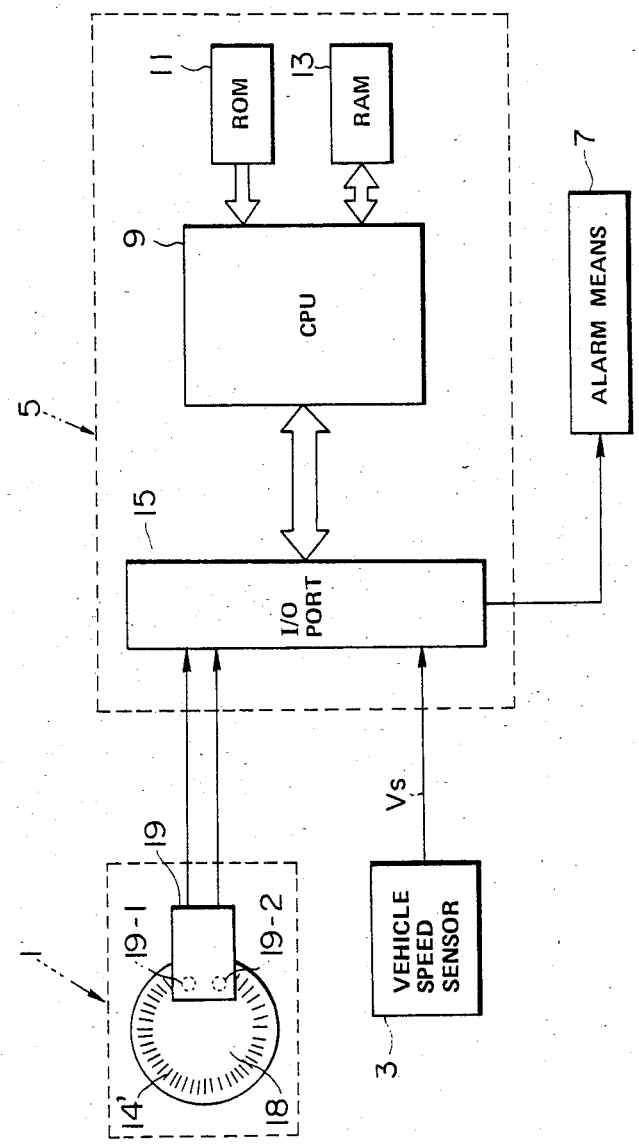

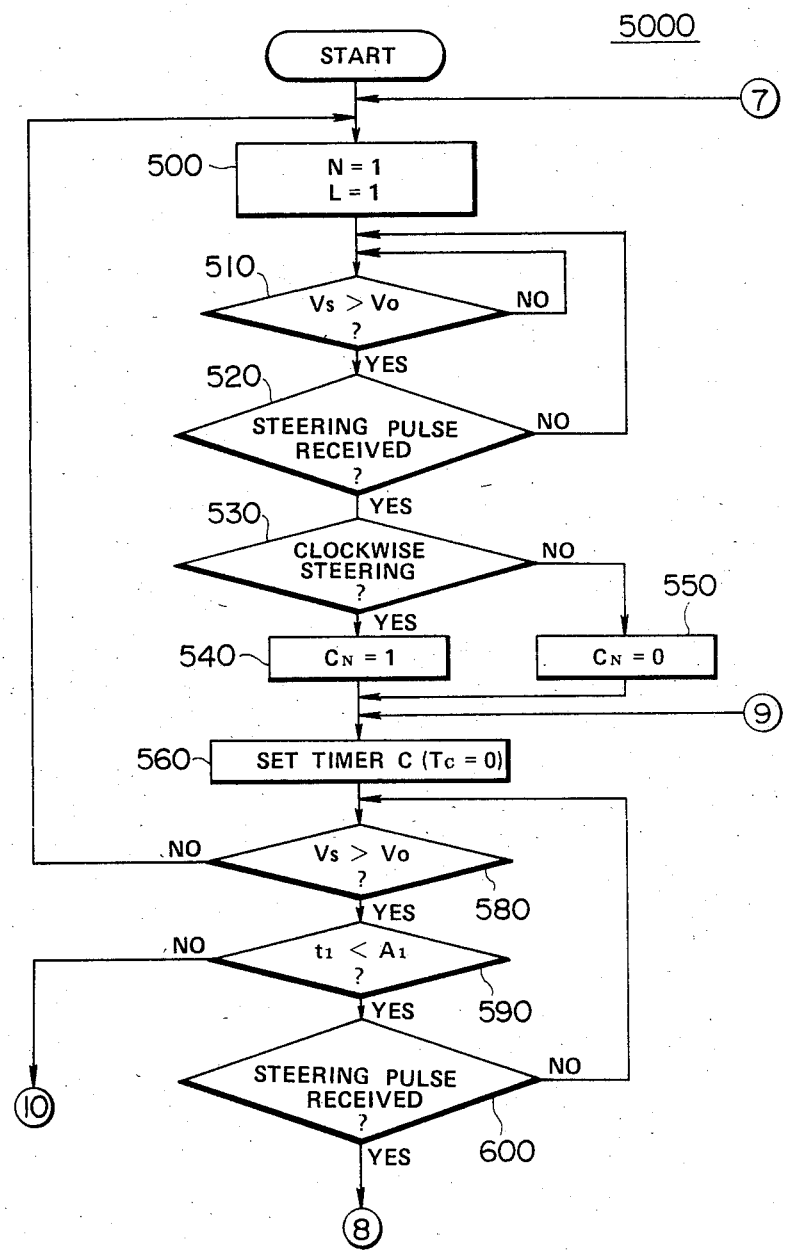

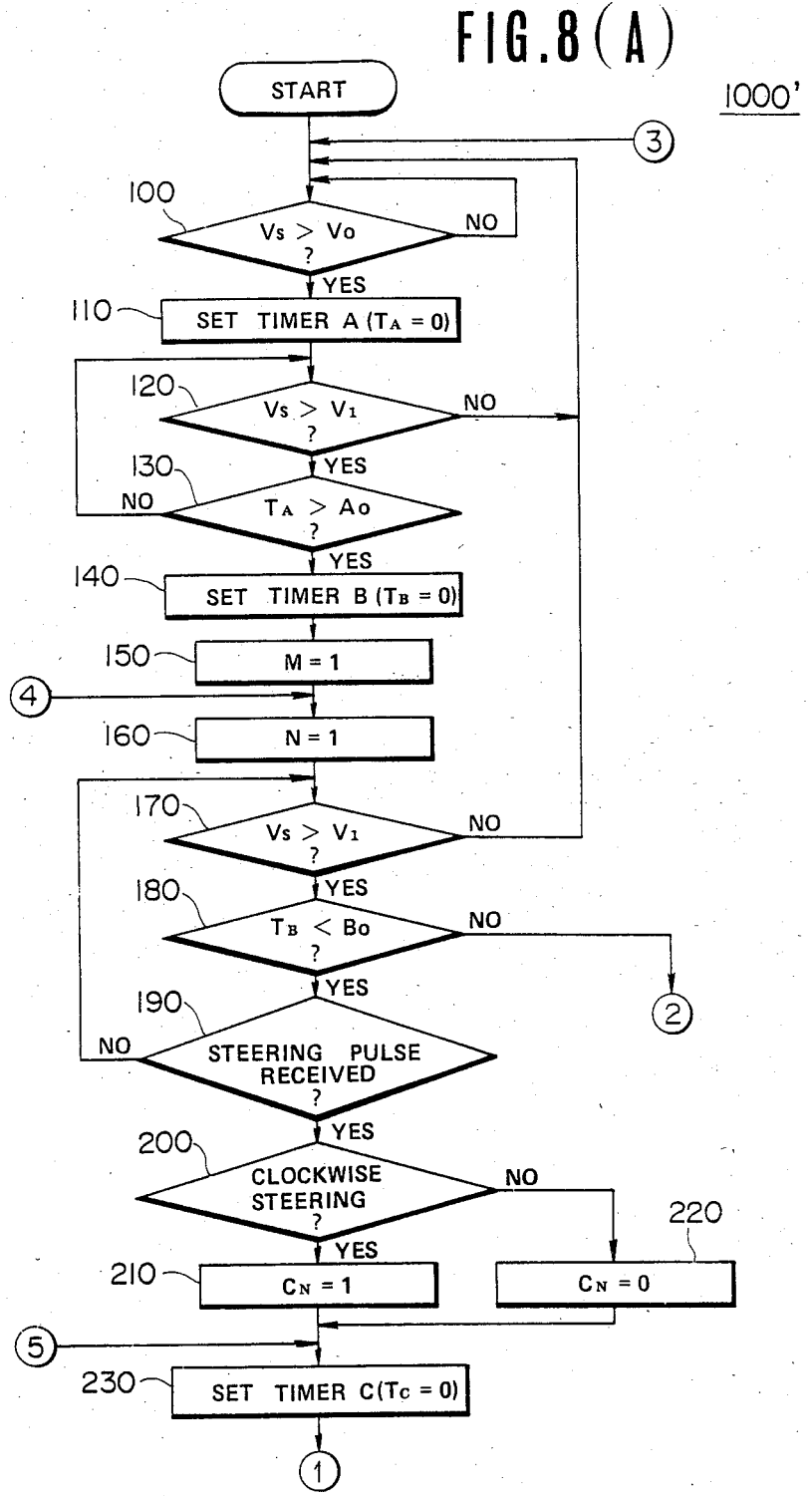

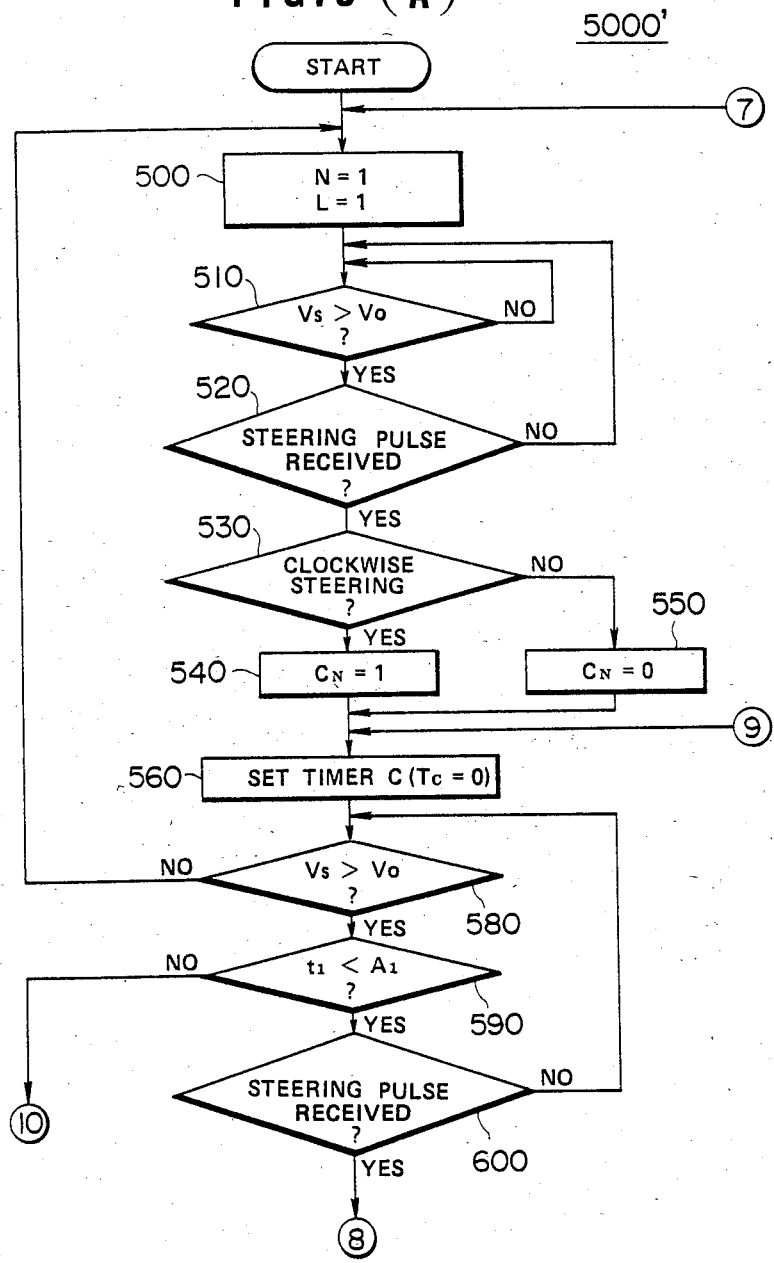

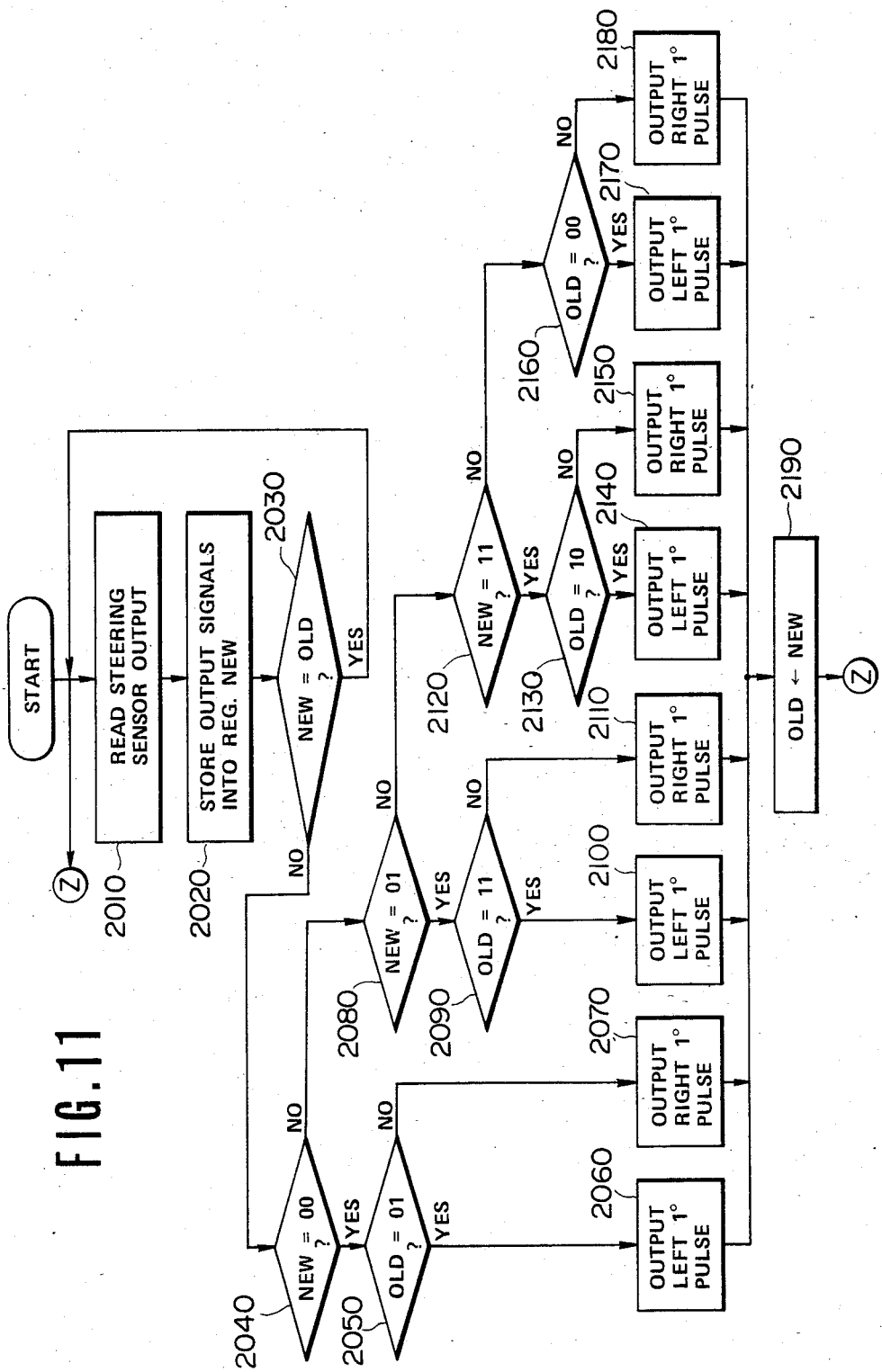

SYSTEM AND METHOD FOR DETECTING DRIVER DROWSINESS INCLUDING DETECTION OF STEERING ROTATION AND REVERSAL

BACKGROUND OF THE INVENTON

1. Field of the Invention

The present invention relates to a system and method for detecting and signalling the drowsiness of an automotive driver in which the driver's drowsy driving behavior is recognized on the basis of the number of steering adjustments within a predetermined interval of time, and the number of steering reversals within the predetermined interval of time.

2. Description of the Prior Art

Japanese Utility Model Registration Publication No. 57-57126 discloses a system for determining the driver drowsiness wherein the system determines that the vehicle driver is steering drowsily depending on the number of steering pulses, each steering pulse being produced whenever the steering wheel is rotated through a predetermined angle, within a predetermined period of time. The disclosure of the above-described publication is incorporated by reference.

However, the system disclosed in the above-described publication has the problem of occasionally recognizing drowsiness erroneously. For example, when the vehicle is travelling along an unpaved road, there will tend to be more frequent steering adjustments than when the vehicle is travelling along an paved road due to the necessity for the driver to correct the direction of the vehicle a number of times according to the holes and bumps in the unpaved road surface. In addition, the driver may purposefully turn the steering wheel back and forth rapidly in an attempt to remain alert. In these cases, the system might make an erroneous determination of the driver's drowsiness. For this reason, detection accuracy cannot be ensured only on the basis of the number of steering pulses.

SUMMARY OF THE INVENTION

With the above-described problem in mind, it is an object of the present invention to provide a system and method for detecting and signalling driver drowsiness with a high detection accuracy.

This can be achieved by providing a system and method for detecting driver drowsiness employing means for detecting changes in steering direction on the basis of steering pulses produced by a steering angle sensor means, each steering pulse being produced whenever the steering wheel is rotated through a predetermined angle, system determining that the driver is drowsy when the number of steering pulses within a fixed interval of time exceeds a first reference value and the number of steering reversals within the fixed interval of time is below a second preset reference value.

BRIEF DESCRIPTION OF THE DRAWINGS

A more complete understanding of the present invention may be obtained from the following description taken in conjunction with the attached drawings in which like reference numerals designate corresponding elements and in which:

FIG. 1 is a block diagram of a system for detecting and signalling driver drowsiness according to the present invention;

FIGS. 7A to 7C are subsequent processing flowcharts executed by the first preferred embodiment of the drowsiness detection means 5 shown in FIG. 1 after execution of the processing flowchart shown in FIG. 6 to actually monitor the driver's steering behavior;

FIGS. 8A to 8D are processing flowcharts executed by second preferred embodiment of the drowsiness detection means 5 shown in FIG. 1 to set first and second reference values;

FIG. 11 is a flowchart for processing the two-bit signals produced by the pair of photo interrupters 19-1 and 19-2.

DETAILED DESCRIPTION OF THE PREFERRED EMBODIMENTS

Figure 2A:
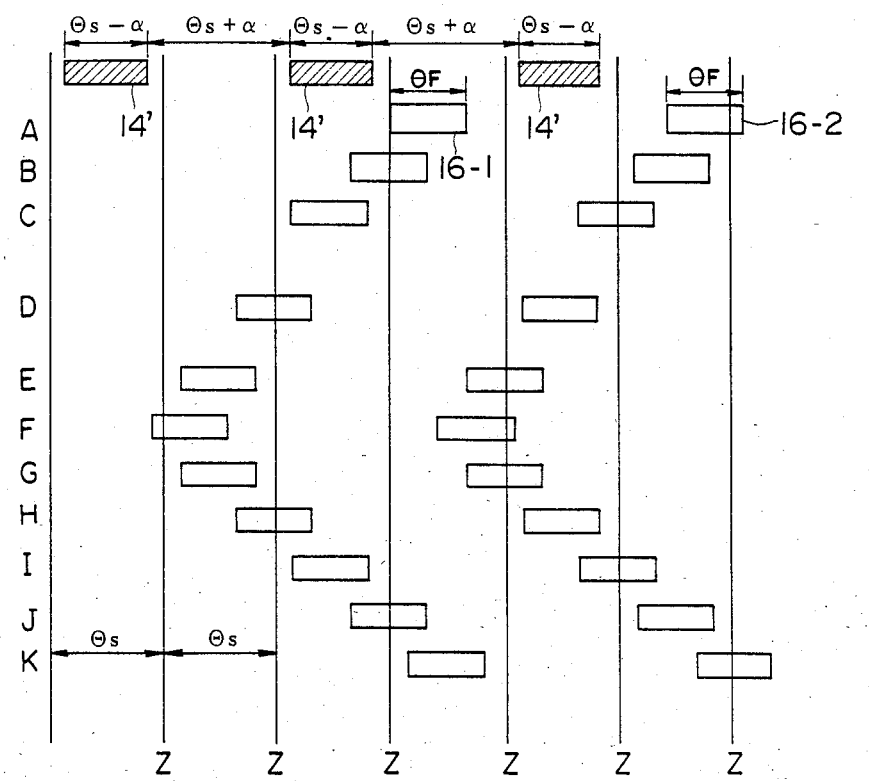
FIG. 2(A) is diagram of the relationship between slits formed in a sensor disk 18 and the windows of a pair of optical sensors 19-1 and 19-2.

Reference will be made to the attached drawings in order to facilitate understanding of the present invention.

In FIG. 1, numeral 1 denotes a steering angle sensor, numeral 3 denotes a vehicle speed sensor for detecting and signalling vehicle speed, numeral 5 denotes a drowsiness detection means, responsive to output signals from the steering angle sensor 1 and the vehicle speed sensor 3, for detecting a particular pattern of steering behavior unique to driving in a state of drowsiness from the output signals from the steering angle sensor 1 and actuating an alarm means 7 to issue an alarm to the driver when the particular pattern is detected. The drowsiness detection means 5 comprises a microcomputer having a Central Processing Unit (CPU) 9, Read Only Memory (ROM) 11, Random Access Memory (RAM) 13, and I/O Port 15.

The steering angle sensor 1, as shown in FIG. 2(A), comprises: (a) a disk 18 located so as to rotate with a steering wheel (not shown) of the vehicle and having a plurality of slits 14' arranged radially symmetrically around its periphery, each slit 14 having a width $\theta s - \alpha$ and being separated from the neighboring slits by $\theta s + \alpha$; and (b) a photo interrupter module 19 having a pair of photo interrupters 19-1 and 19-2 opposite the disk 18 and producing two rectangular-wave electrical signals to be described later as the disk 18 rotates and passes the photo interrupter module 19.

The photo interrupters 19-1 and 19-2 are arranged to be separated by $n \times \theta s + 5\theta s/2$ ($n = 0, 1, \ldots$) so that the photo interrupters can resolve a minimum displacement of $\theta s/2$.

Figure 2B:
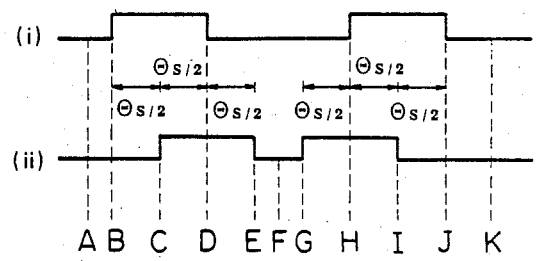
FIG. 2(B) is a timing chart of the two-bit signal generated by the pair of photo interrupters 19-1 and 19-2 shown in FIG. 1.

The output signals of the photo interrupter module 19 have a fixed phase difference of $\theta s/2$, as appreciated from FIG. 2(B). The mutual level change state of the output signals provides the basis for determining the direction of rotation of the steering wheel, as will be described later. It should be noted that in FIG. 2(A) reference symbol Z denotes the boundary between the presence or absence of the output signals of the photo interrupter module 19 and $\theta s$ denotes a predetermined angle of steering adjustment.

Figure 3:
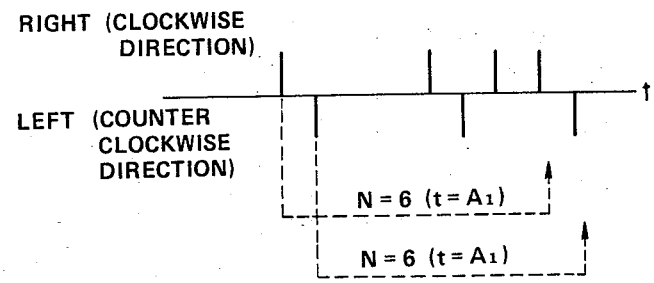
FIGS. 3 and 4 are examples of output signals produced by the steering angle sensor shown in FIG. 1 when the driver is alert.
Figure 4:
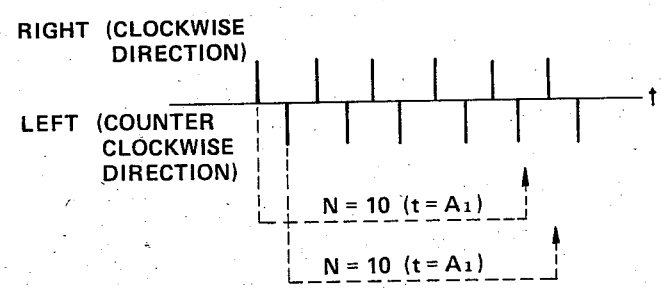
Figure 5:
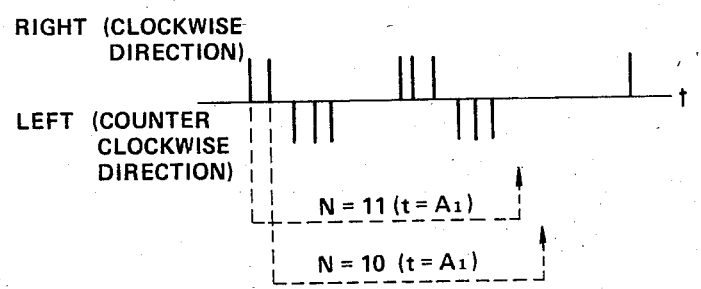
FIG. 5 is an example of the output signals of the steering angle sensor when the driver is drowsy.

FIGS. 3 and 4 show examples of states wherein steering pulses derived from the output of a steering angle sensor when the vehicle driver is alert. FIG. 5 shows an example of a state wherein the steering pulses are outputted when the vehicle driver is drowsy.

It should be noted that in FIGS. 3 through 5, the steering pulses on the upper side of each figure with respect to the time axis t are due to clockwise steering by the driver and the steering pulses on the lower side of each figure with respect to the time axis t are due to counterclockwise steering by the driver.

The conventional drowsiness detection and alarm system determines that the vehicle driver is drowsy when the number of steering pulses derived from the steering angle sensor reaches a predetermined number (, e.g., 10) within a fixed interval of time $A_1$ (, e.g., 15 seconds). (This can be appreciated from FIG. 3 and FIG. 5). Thus, the conventional drowsiness detection and alarm system may erroneously determine that the driver is drowsy when the steering wheel is purposefully rotated clockwise and counterclockwise over a narrow range of steering angle repeatedly, as shown in FIG. 4.

To prevent such errors, the first preferred embodiment according to the present invention determines that the vehicle's driver is drowsy on the basis of comparisons between a characteristic value $D_T$ of the number of reversals and a characteristic value $N_T$ of the calculated number of steering pulses. The first preferred embodiment is based on the assumption that the nunber of reversals of the steering wheel will be much smaller than the number of steering pulses when the driver is drowsy since his or her responsiveness to deviations from the driving course is extremely low. By way of example, say, in FIG. 3 the number of steering pulses N is 6 and, on the other hand, the number of reversals is 4. In FIG. 4, the number of steering pulses N is 10 and, on the other hand, the number of reversals 9. In FIG. 5, the number of steering pulses N is 11 and 10, but the number of reversals is only 3.

Figure 6A:
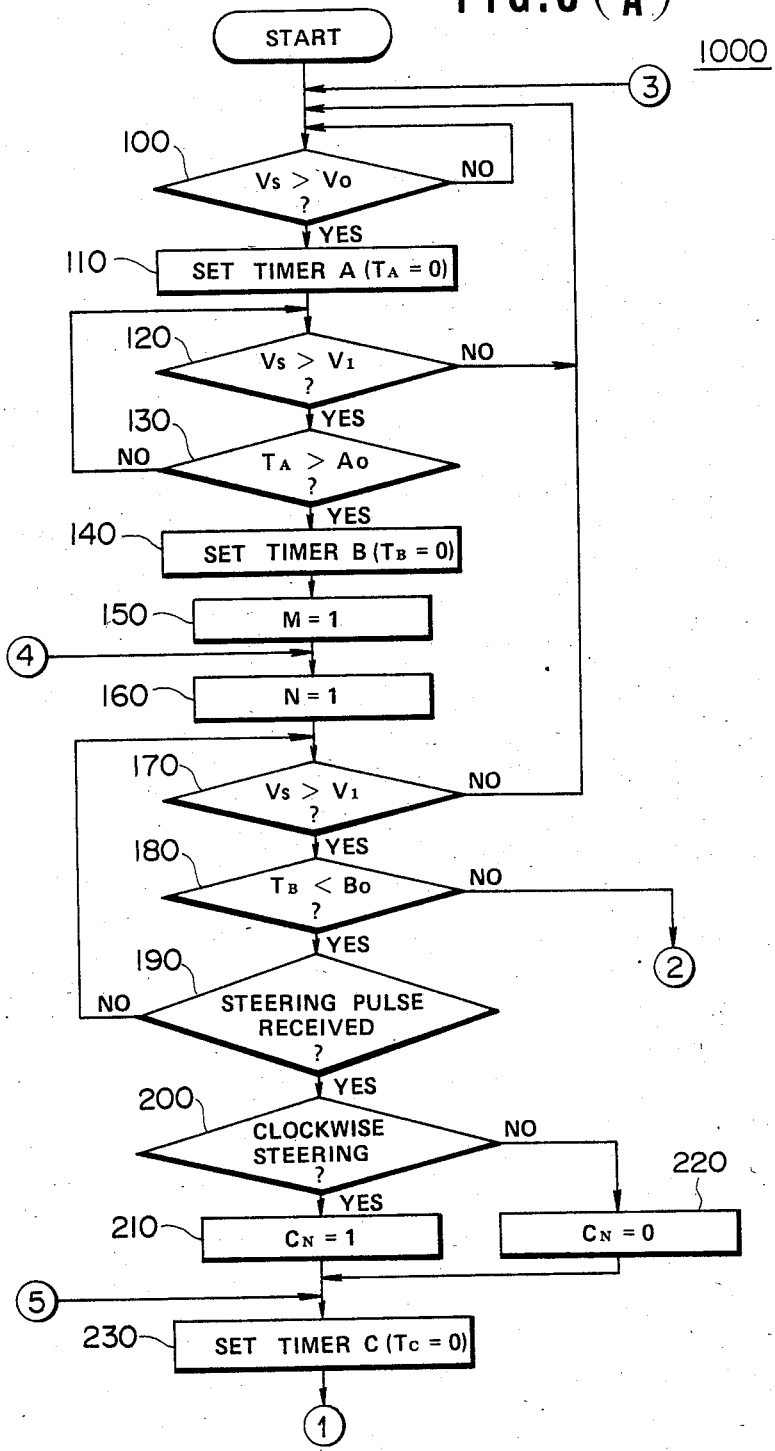
FIGS. 6A to 6C are processing flowcharts executed by a first preferred embodiment of the drowsiness detection means 5 shown in FIG. 1 to obtain a first reference value.
Figure 6B:
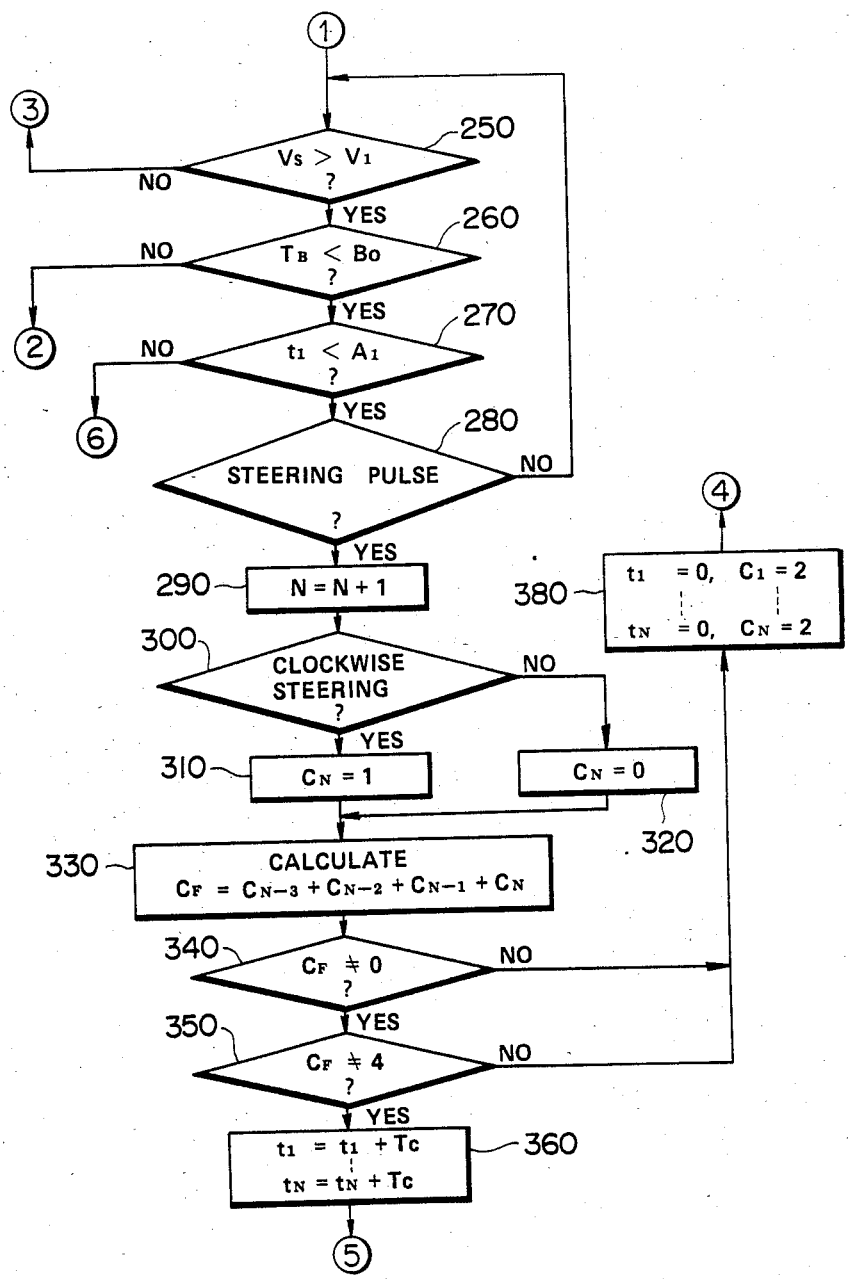
Figure 6C:
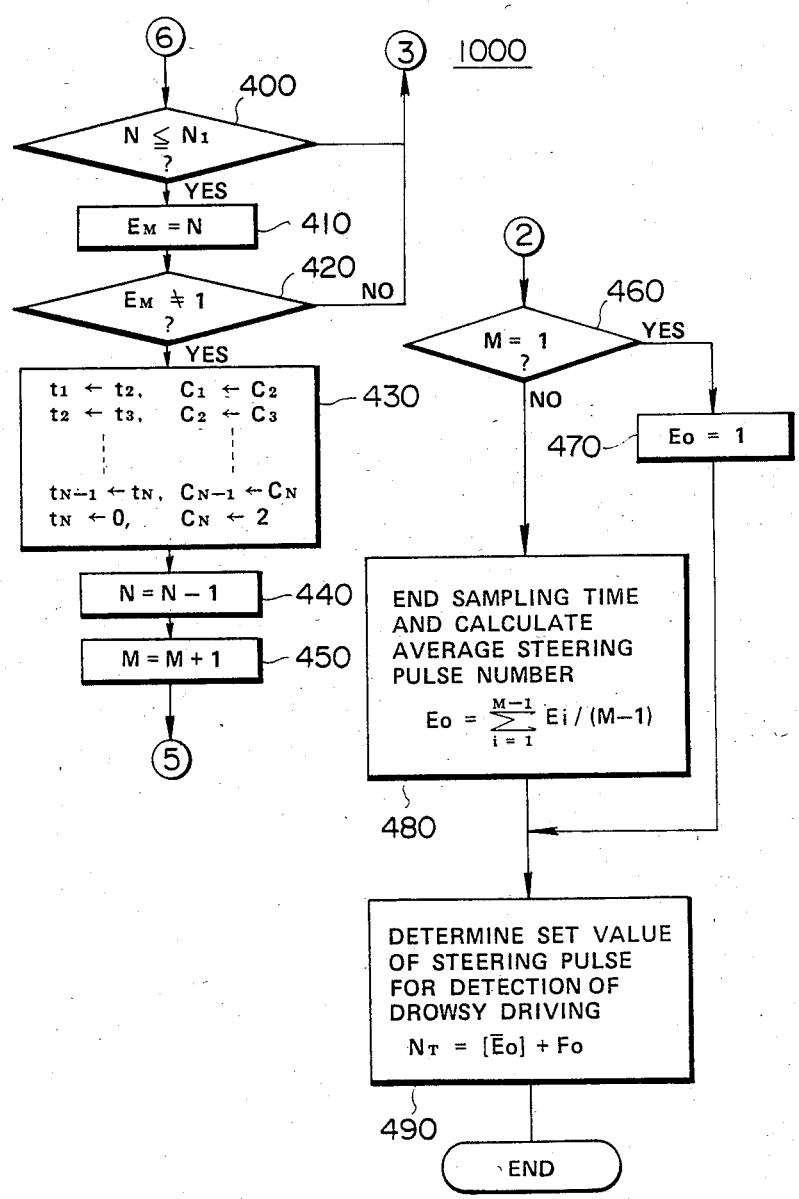
Figure 7B:
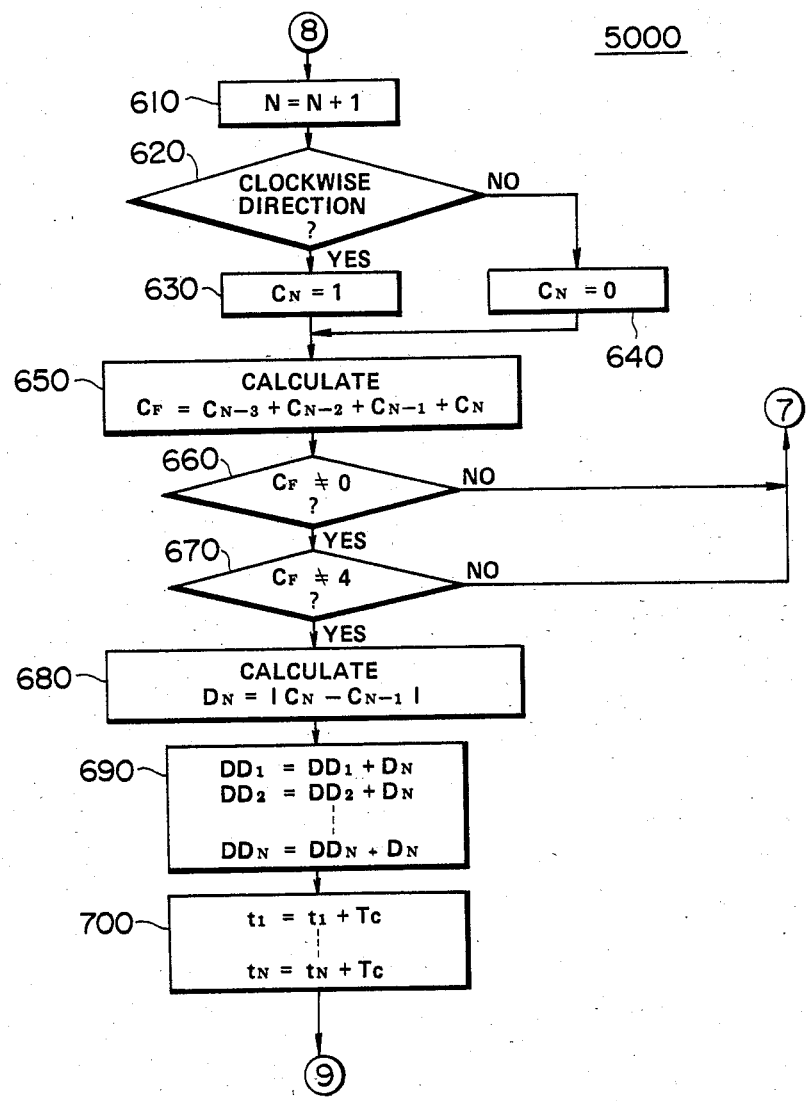
Figure 7C:
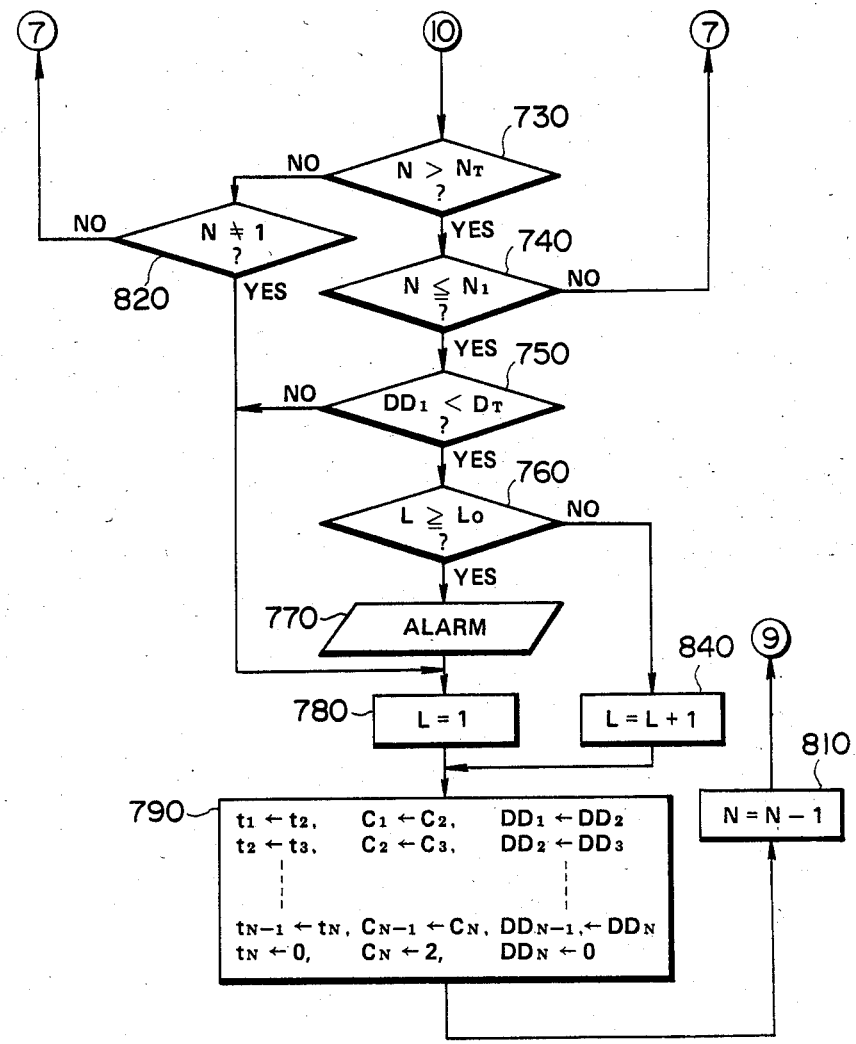

FIG. 6 shows a reference value setting loop used to derive a first characteristic value $N_T$ from the number of steering pulses from the steering angle sensor 1. FIG. 7 shows a drowsiness detection loop used to detect driver drowsiness on the basis of the above-described first characteristic value $N_T$ and a second characteristic value $D_T$ derived from the number of steering reversals.

First, the first reference value setting loop 1000 shown in FIG. 6 will be described.

In step 100, the CPU 9 detects whether the vehicle speed Vs measured by the vehicle speed sensor 3 exceeds a higher predetermined value Vo (, e.g., 70 km/h). After the CPU 9 detects that the vehicle speed Vs exceeds the higher predetermined value of speed Vo, the routine goes to step 110, wherein a timer A is started in order to measure a predetermined interval of time Ao (, e.g., 1 minute). In step 120, the CPU 9 confirms that the vehicle speed Vs is above a lower predetermined value $V_1$ which is slightly less than the higher predetermined value Vo throughout the above-described predetermined period of time Ao in order to prevent drowsiness evaluation in such transient states as when, e.g., the vehicle is moving from an interchange of a highway road to a thru line. After the confirmation in steps 100 through 130, the routine goes to a subsequent processing loop to obtain the first characteristic value $N_T$ (steps 140 through 490).

In step 140, a timer B is started in order to measure a previously set data sampling period Bo (, e.g., 5 minutes). In step 150, a register M, which is to be incremented whenever a fixed interval of time $A_1$ passes after the last received steering pulse (the fixed interval of time $A_1$ will be described later), is set to an initial value of 1. In step 160, a register N representing the number of steering pulses received is also set to an initial value of 1. In subsequent step 170, the CPU 9 checks to see if the current vehicle speed Vs is still above the lower predetermined value $V_1$. If not, the processing loop 1000 is restarted from step 100. If yes, in step 180 the CPU 9 checks to see if the sampling period $B_0$ has elapsed. This will not be the case, practically, until numerous steering pulse have been received, so in this case, control passes to step 190 (otherwise to step 460), which returns control to steps 170 and 180 until the first steering pulse is received.

After the CPU 9 receives the first steering pulse in the step 190, the CPU 9 in step 200 determines whether the first steering pulse is derived from clockwise or counterclockwise rotation of the steering wheel. The method for determining the rotation direction will be described later with reference to FIG. 11. If clockwise rotation is determined (YES in the step 200), then the first (N=1) cell of a steering direction array $C_N$ is set to 1 in the next step 210. On the other hand, if counterclockwise rotation is determined (NO in the step 200), the cell $C_N$ is set to 0 in step 220. In subsequent step 230, the CPU 9 sets a timer C which indirectly clocks the duration of a fixed interval of time $A_1$ (, e.g., 15 seconds). The timer C is actually used to clock the intervals between consecutive steering pulses. The pulse intervals are tallied in a series of staggered running time totals $t_1 - t_n$, to be described in detail later, the largest of which is repeatedly compared with the fixed interval $A_1$.

In subsequent steps 250 and 260, vehicle speed Vs and sampling time $T_B$ are checked as in steps 170 and 180. Again, control passes to step 460 if the data sampling period Bo has elapsed ($T_B > Bo$), and the routine is restarted from step 100 if vehicle speed Vs has dropped below the threshold level $V_1$. Otherwise, the sum $t_1$ of the intervals between the last N steering pulses is compared to the fixed interval $A_1$ in step 270 and if $t_1 \geq A_1$, control passes to step 400 to be described later. If $T_1 < A_1$, then in step 280, the next steering pulse is awaited. If a steering pulse corresponding to the current N value has not been received, the loop 250-280 is repeated.

After a steering pulse has been received in the step 280, the register N is incremented in step 290 and the CPU 9 executes the same processing as in the steps 200 through 220 described above in steps 300-320. After the CPU 9 has performed the flag assignment of the register $C_N$ in either step 310 or step 320, the routine goes to step 330 wherein the CPU calculates the sum $C_F$ of the last four rotation direction flag registers $C_N$ through $C_{N-3}$. For example, if two of the last four steering pulses were due to clockwise rotation of the steering wheel, the sum of the last four flag registers C, i.e., $C_{N-3}+C_{N-2}+C_{N-1}+C_N$, is two. This step in conjunction with the subsequent steps 340 and 350 serves to check the incoming steering pulse train for long series of pulses in the same direction, which would imply that the vehicle is executing a turn. Since this would not provide a representative sample of steering pulses, if a turn is recognized in steps 340 or 350, the steering pulse count is cleared until more typical, back-and-forth steering prevails. (This test is applied only after the number of inputted steering pulses reaches 4). In more detail, in step 340, if the sum $C_F$ equals 0, the vehicle is judged to be passing through a left-hand curve since the contents of the registers $C_N$, $C_{N-1}$, $C_{N-2}$, and $C_{N-3}$ are all zero. On the other hand, if $C_F = 4$ in step 350 the vehicle is judged to be passing through a right-hand curve since the contents of the registers $C_N$, $C_{N-1}$, $C_{N-2}$, and $C_{N-3}$ are all 1. In both cases (, i.e., $C_F = 0$ and $C_F = 4$), the time values in the registers $t_1$ through $t_N$ are cleared and the registers $C_1$ through $C_N$ are set to some numerical value (in this embodiment, 2) other than 0 and 1 in step 380. Then, the routine returns to the step 160 to restart the counting of the steering pulses.

On the other hand, if the routine does not return to the step 160, i.e. if $1 \leq C_F \leq 3$ in steps 340, 350, the measured interval of time (indicated by the value $T_c$ of the timer C) between the last steering pulse and the immediately preceding steering pulse is added in step 360 into the registers $t_1$ through $t_N$, each indicating the elasped time from one of the last N steering pulses and control returns to the step 230 to restart the timer C. This loop 230-360 is repeated for each steering pulse until one of the period $A_1$ or Bo has elapsed.

When the register $t_1$ indicates in the step 270 that the fixed interval of time $A_1$ has elapsed, the routine goes to step 400. In the step 400, if the value of the register N indicating the number of steering pulses within the fixed interval of time $A_1$ is equal to or greater than a fixed number of pulses $N_1$, the steering pulses are judged to be due to abnormally repetitive steering operations as the vehicle moves along a rough road. In this case also, the steering pulse characteristics are not representative of normal driving behavior and so the steering pulse sampling process is restarted from step 100. On the other hand, if in the step 400 $N \leq N_1$, the counted number of steering pulses (the value of the register N) is loaded into one cell $E_M$ of an array E so as to record the number of steering pulses for each of a plurality of staggered fixed time intervals $A_1$ within the data sampling period Bo in step 410. Next in step 420, the value $E_M$ is checked against a lower limit, namely 1.

If $E_M > 1$ is in step 420, then the contents of the registers $t_2$ through $t_N$ and registers $C_2$ through $C_N$ are moved in step 430 into corresponding registers whose subscripts are reduced by one, e.g., $t_1 \leftarrow t_2$, $t_2 \leftarrow t_3$, ..., $t_{N-1} \leftarrow t_N$, $t_N \leftarrow 0$, $C_1 \leftarrow C_2$, $C_2 \leftarrow C_3$, ..., $C_{N-1} \leftarrow C_N$, $C_N \leftarrow 2$. Also, the final registers $T_N$ and $C_N$ are assigned values 0 and 2 respectively. Thus, as the subscripts increase through the t-array, the values thereof decrease since they include one less term of timer $T_c$ each, up to a zero value in $t_N$. In other words, $t_{N-1}$ and $C_{N-1}$ represent the pulse interval and direction of the last successfully received pulse. Next in steps 440 and 450, the CPU 9 decrements the register N by one and increments the register M by one, respectively. Thereafter, the routine returns to the step 230.

In summary, to this point the CPU 9 counts steering pulses received in a number of overlapping periods $A_1$ starting which each pulse, as shown by the dotted line in FIGS. 3-5. If the number of pulses received and their directions reflect suitably typical steering conditions, the pulse counts are recorded in (M−1) cells of an array.

Finally, after the timer $T_B$ indicates that the elapsed time covers the data sampling period Bo (step 180 or step 260), the data sampling is stopped and an average number of steering pulses Eo per fixed interval of time $A_1$ is calculated in step 480 according to the equation $$\overline{Eo} = \sum_{i=1}^{M-1} Ei/(M-1).$$

Thereafter, the routine goes to step 490 wherein the calculated average pulse number $\overline{Eo}$ is incremented by a fixed number (, e.g., 5) and the final value is the first reference value $N_T$. Thereafter, the routine goes to the subsequent drowsy driving detection loop 5000 shown in FIG. 7.

It should be noted that if during the execution of the first reference value setting loop 1000, the vehicle speed Vs drops below the lower predetermined value $V_1$ in the step 250 (or the steps 120 and 170), the sampling process is restarted from the step 100.

Next, the execution of the drowsy driving detection loop 5000 will be explained with reference to FIG. 7.

First in this loop, the register N is set to 1 and the register L which indicates the number of consecutive loop cycles through which steering conditions reflect drowsiness is also set to 1 in step 500. The subsequent steps 510 through 670 are identical to the steps 170 through 350 of FIG. 6, minus the sampling period time checks at steps 180 and 260. However, it should be noted that at step 590, if $t_1 < A_1$, then control jumps to step 730, and if the value $C_F$ does not fall within the acceptable range in either of steps 660 or 670, then control returns to step 500. After ascertaining that $C_F$ falls within the desired range in steps 660 and 670, the routine goes to step 680.

In the step 680, in order to count the number of reversals for the steering direction within the fixed interval of time $A_1$, one reversal meaning that after being rotated clockwise or counterclockwise, the steering wheel is rotated in the opposite direction, the absolute value $D_N$ of the difference between the values of the direction flag register $C_N$ of the last steering pulse and that of the previous steering pulse (that is to say, the value of $D_N$ is 1 when there is a reversal and the value of $D_N$ is 0 when there is no reversal) is calculated in step 680. In subsequent step 690, the value of $D_N$ is added to the registers $DD_1$ through $DD_N$, which indicate the number of steering reversals produced during the corresponding period $A_1$, so that the indices of the DD-registers correspond to those of the t- and c-registers. In step 700, the time indicated by the timer Tc is added to the value of the time registers $t_1$ through $t_N$ in the same way as in step 360 described above. Thereafter, control returns to the step 560. When, after sufficient repetition of the steps 560 through 700, the value of the time register $t_1$ indicates the expiration of the fixed time interval $A_1$ in the step 590, the routine goes to step 730, wherein the value of the register N indicating the number of steering pulses received during the newly completed fixed interval of time $A_1$ is compared with the first reference value $N_T$ derived by means of the loop 1000 of FIG. 6. If $N > N_T$ in the step 730, the routine goes to step 740 wherein in order to ascertain that the result ($N > N_T$) is not due to the fact that the vehicle is running on a rough road, that value of the register N is compared with a larger constant value $N_1$. If $N \leq N_1$, i.e., the vehicle is not running on a rough road, the routine continues to step 750 wherein the value of the register $DD_1$ indicating the number of reversals within the newly completed fixed interval of time $A_1$ is compared with a second preset reference value $D_T$ (for example, 5). If $DD_1 < D_T$ in the step 750, the routine goes to step 760 wherein the value of the register L is compared with a constant number Lo. If $L \geq Lo$, the CPU 9 operates the alarm means 7 to issue an alarm. In summary, the CPU 9 operates the alarm means 7 to issue the alarm when the value of the register N indicating the number of steering pulses received during the fixed time interval $A_1$ satisfies the conditions $N_T < N \leq N_1$ and the number of steering reversals within the fixed interval of time $A_1$ is less than the second reference value $D_T$ for Lo consecutive detection cycles.

It should be noted that if $N \leq N_T$ in the step 730 (the answer is NO), the routine goes to step 820 wherein the value of the register N is checked to see if $N \neq 1$. If $N = 1$ in the step 820 (the answer is NO), then there were no steering pulse received for at least the fixed interval of time $A_1$ after the last steering pulse and control returns to the step 500 to restart the drowsy driving detection process. If $N \neq 1$ in the step 820, the routine goes to step 780 which will be described later. Similarly, if $DD_1 \geq D_T$ in the step 750, the routine goes to step 780. On the other hand, if $L < Lo$ in the step 760, the routine goes to step 840, wherein the register L is incremented, and then to step 790 described later. Finally, if $N > N_1$ in the step 740, then the vehicle is judged to be travelling over a rough road and control returns to the step 500.

When the routine goes to the step 780, the register L is reset to 1. In the subsequent step 790, the contents of the time registers $t_2$ through $t_N$, registers $C_2$ through $C_N$, registers $DD_2$ through $DD_N$ are moved into the corresponding registers with subscripts reduced by one, that is, $t_1 \leftarrow t_2$, $t_2 \leftarrow t_3$, ..., $t_{N-1} \leftarrow t_N$, $t_N \leftarrow 0$, $C_1 \leftarrow C_2$, $C_2 \leftarrow C_3$, ..., $C_{N-1} \leftarrow C_N$, $C_N \leftarrow 2$, $DD_1 \leftarrow DD_2$, $DD_2 \leftarrow DD_3$, ..., $DD_{N-1} \leftarrow DD_N$, and $DD_N \leftarrow 0$. In the next step 810, the register N is decremented to account for the newly completed and record period $A_1$. Finally, the routine returns to the step 560 to continue monitoring steering pulses for the criteria defined by the steps 730 through 760.

It should be noted that if the vehicle speed Vs drops below the higher predetermined value of speed Vo in the step 580, the drowsy driving detection is restarted from the beginning.

Figure 8B:
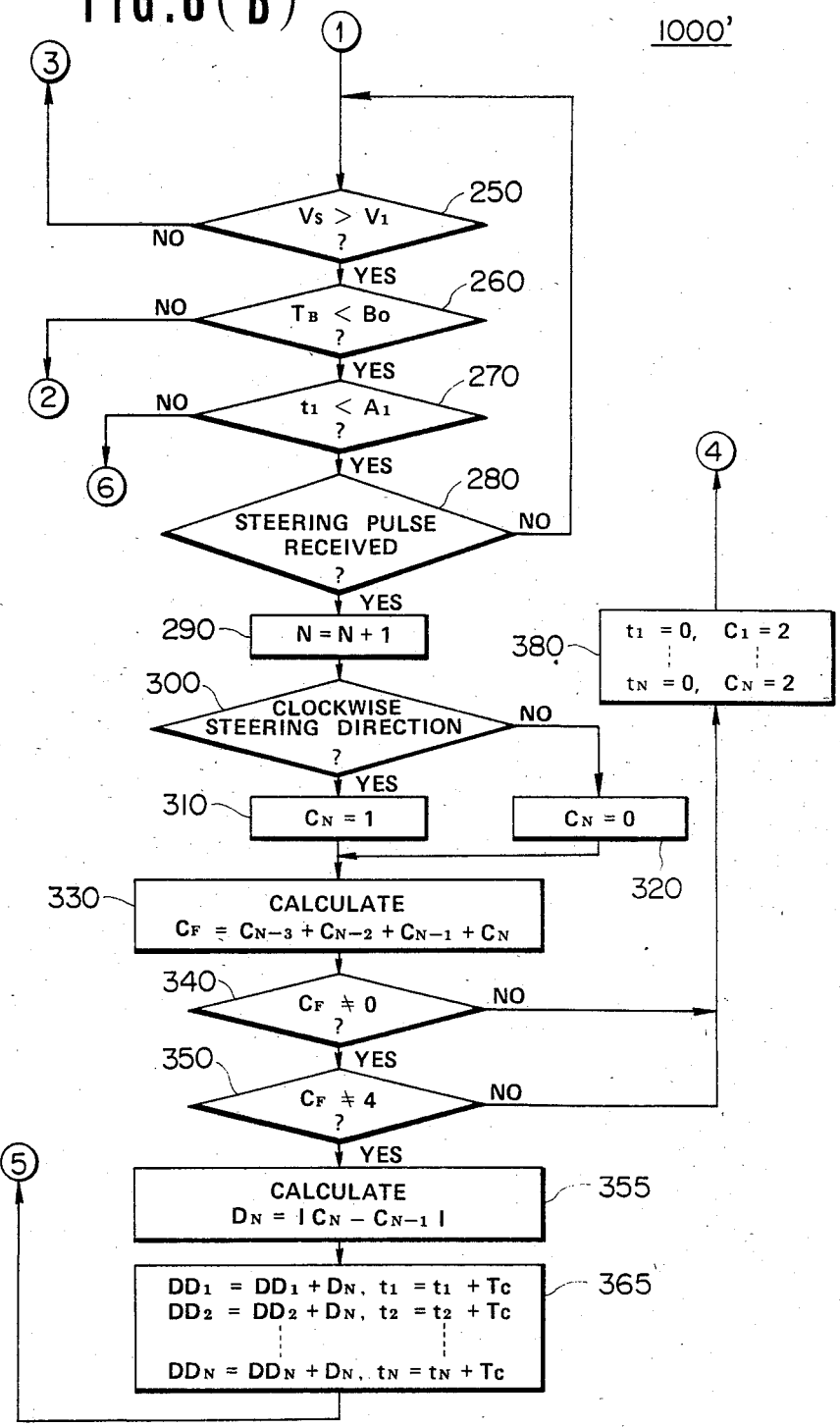
Figures 8C, 8D:
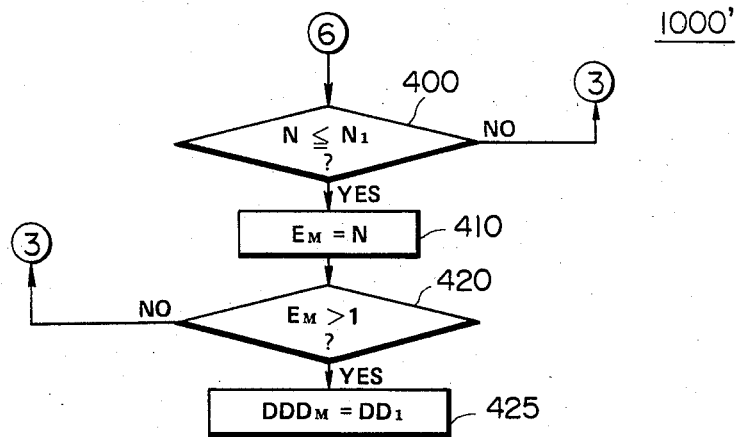
Figure 9:
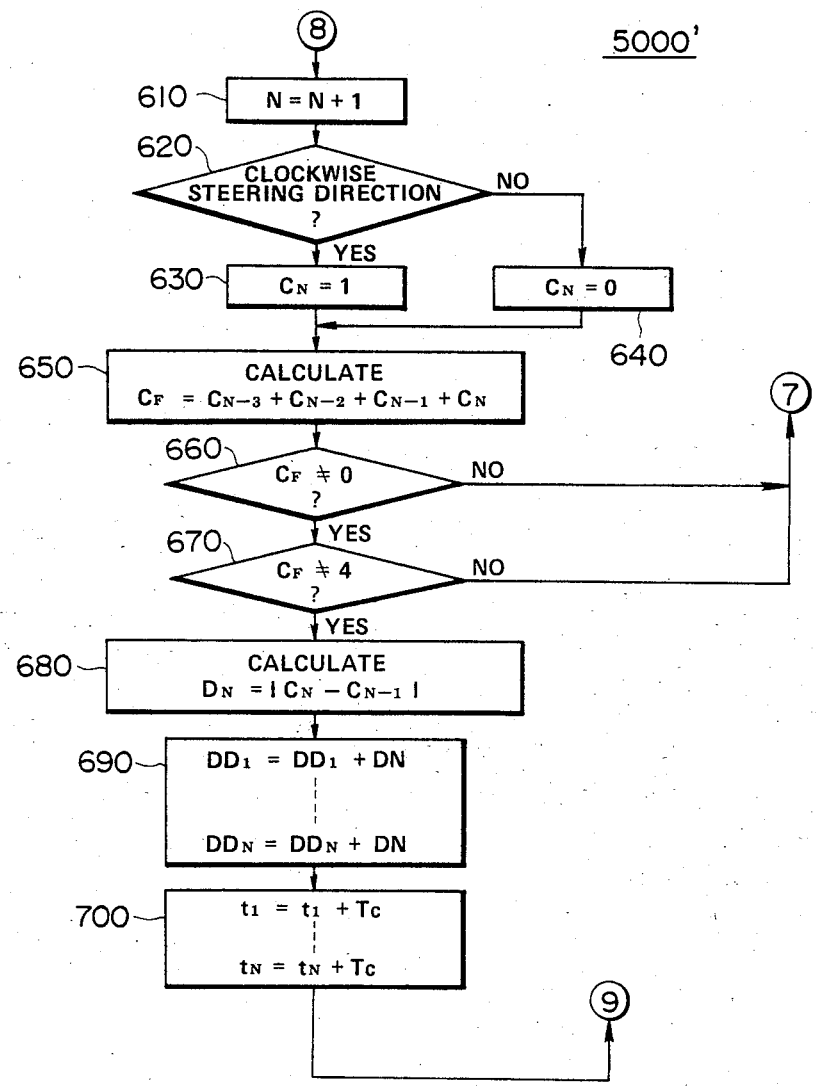
FIGS. 9A to 9C are subsequent processing flowcharts executed by the second preferred embodiment of the drowsiness detection means 5 shown in FIG. 1 after the processing flowchart shown in FIG. 8 is executed to actually monitor the driver's steering behavior with reference to the first and second reference values set in the flowchart shown in FIG. 8.
Figure 9C:
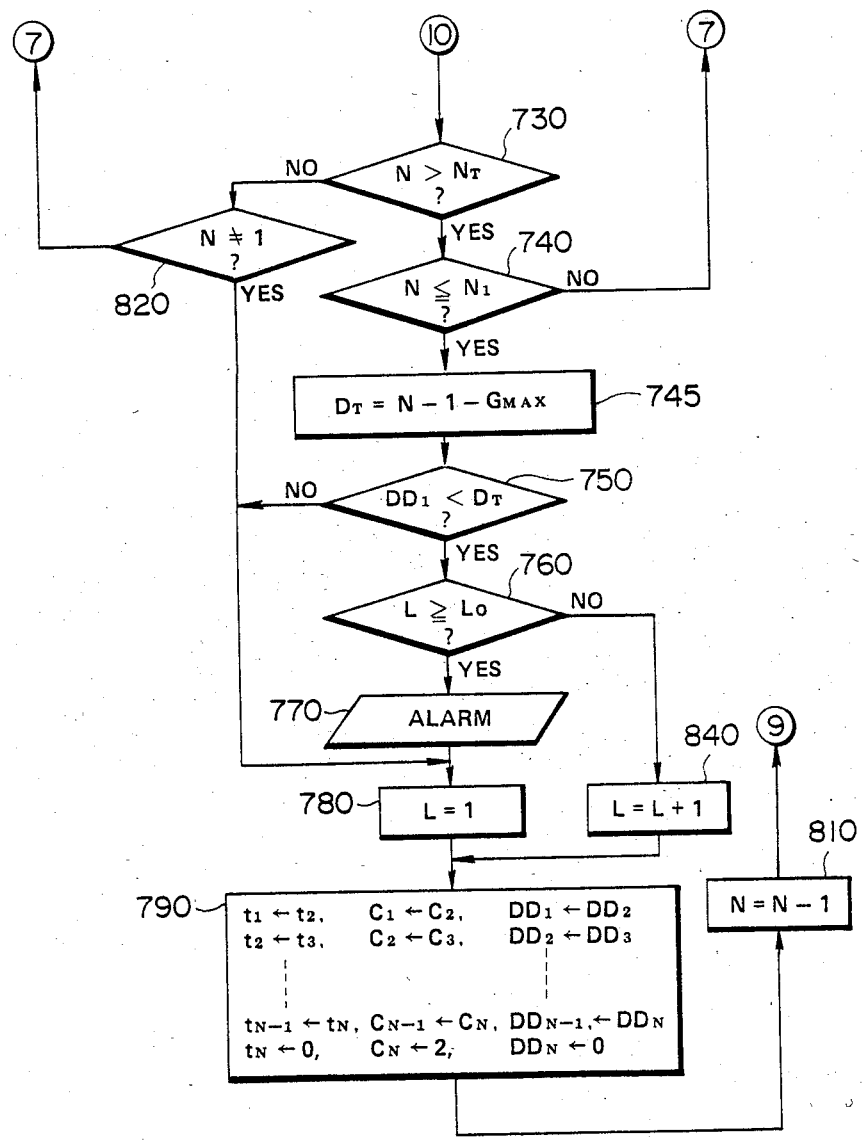

FIGS. 8 and 9 show a second preferred embodiment of the present invention, wherein the second reference value $D_T$ for the number of steering reversals based on the drowsy driving detection is calculated on the basis of a representative sample of steering pulses so that the drowsy driving state can be detected according to actual current running situations of the vehicle. The second reference value $D_T$ is calculated by using the number of steering pulses $E_M$ for each fixed period of time $A_1$ within the data sampling period Bo (for example, 5 minutes) and the number of steering reversals $DDD_M$ to derive an intermediate, nonreverse count $E_M - 1 - DDD_M$, the maximum value of which is then obtained, deriving the maximum possible number of steering reversals $D = N - 1$ (N indicates the maximum steering pulse count), and subtracting the maximum value of ($EM - 1 - DDD_M$) from ($N - 1$) to derive $D_T = N - 1 - \text{Max}(EM - 1 - DDD_M)$.

Figure 10:
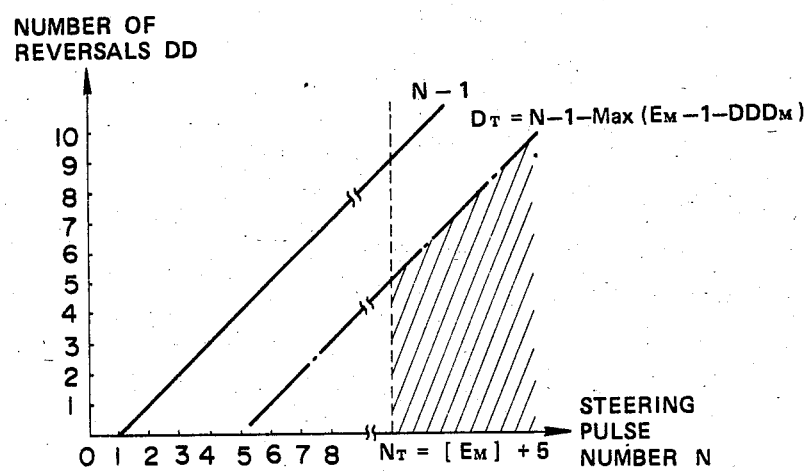
FIG. 10 is a supplemental diagram for explaining the essential feature of the second preferred embodiment shown in FIGS. 8 and 9.

These relations are clarified graphically in FIG. 10, which plots the number of steering reversals against the steering pulse count. The solid line illustrates the relationship $D = N - 1$ (e.g. given two pulses, there can be at most only one reversal). The dotted-dashed line is offset from this by a constant (Max ($EM - 1 - DDD_M$)). The dashed line reflects the effect of the threshold pulse count $N_T$, which is chosen empirically so as to enhance reliability. The shaded area greater than both of the latter lines is the region which reflects driver drowsiness.

The routines of the second embodiment correspond strongly with those of the first embodiment. In fact, FIG. 9 differs from FIG. 7 only in one step and FIG. 8 differs from FIG. 6 only in the inclusion of six additional steps. These steps are all that need to be explained in detail with regard to the second embodiment.

Up to step 350, FIGS. 6 and 8 are identical. In steps 355 and 365 of FIG. 8, however, the reversal count $D_N$ is derived from the last two direction flag registers $C_N$ and $C_{N-1}$ and then added to the values in the reversal total registers $DD_1$ through $DD_N$, as in steps 680 and 690 of FIG. 7. In addition, the function of step 430 in FIG. 6 is enhanced with steps 425 and 435 in FIG. 8. In step 425, the total reversal count $DD_1$ for the last sample period $A_1$ is recorded in a corresponding cell $DDD_M$ of an array DDD. Then in step 435, the cells $DD_1$ through $DD_{N-1}$ are updated with the contents of the next higher cell ($DD_2$ through $DD_N$) and cell $DD_N$ is assigned the value zero before beginning the next steering pulse sampling cycle.

These above steps provide an array DDD of reversal counts similar to the array E of pulse counts for use in steps 493 and 498 following completion of the sampling period Bo. In step 493, an array G of non-reversal pulse counts is constructed by subtracting each reversal count $DDD_i$ from the total number of pulses Ei in the same period minus one. The maximum value of array G is then found in step 498. This maximum value $G_{MAX}$ represents the upper limit of non-reversal pulses and so in a sense represents a lower limit of reversals. This value will be used repeatedly in FIG. 9 to derive the second reference value $D_T$ in accordance with current driving conditions.

FIG. 9 differs from FIG. 7 only in that after the current pulse count N is found to be in range in step 740, the reversal reference value $D_T$ is derived from the following equation: $D_T = N - 1 - G_{MAX}$. The newly derived value $D_T$ is then used in step 750, as in FIG. 7.

Since the reference value $D_T$ is derived directly from the total pulse count N and from the empirically obtained $G_{MAX}$ value, the criterion imposed in step 750 will more accurately reflect varying road conditions and individual variations among drivers than in the first embodiment.

FIG. 11 is a detailed processing flowchart for the process of determining the direction of steering pulses. Although the steering angle sensor 1 outputs one-bit signals, the CPU 9 receives these as a single two-bit signal and loads them into the register NEW. If the bit state of the two-bit signal is the same as that of the immediately preceding signal state, the routine returns to step 2010, having determined that there has been no adjustment of the steering wheel. If the bit state of the two-bit signal is changed, the routine goes to the steps 2040 through 2180 in order to determine whether the change in the bit state of the signal is derived from rotation in the clockwise direction or counterclockwise direction. The four possible bit states can be though of as forming a cycle, e.g. 00-01-11-10-00. Thus each bit state can change to one of two other bit states depending on the direction of steering adjustment. In steps 2040 through 2180, the new signal state of the two-bit signal the register NEW is compared with the last signal stored in the register OLD in order to determine which of the neighboring bit states is produced, i.e. which steering direction, and then a steering pulse indicating 1° of rotation in the detected direction is output. In step 2190, the contents of the register NEW are moved into the register OLD for comparison with the bit state of the next two-bit signal.

As described hereinabove, in the drowsiness detection and alarm system according to the present invention for detecting the drowsy driving state on the basis of a reference value which is derived from steering pulses, each produced whenever the steering wheel is rotated through a predetermined angle, means for detecting the change in the steering direction is provided so that driver drowsiness can be detected on the basis of the number of steering pulses and the number of changes in the steering direction.

Therefore, as compared with the conventional drowsy driving detecting and alarming system which recognizes the drowsy driving state only on the basis of the number of steering signals, the system according to the present invention can more accurately and reliably detect driver drowsiness.

It will be fully understood by those skilled in the art that the foregoing description is made in terms of the preferred embodiments and various changes and modifications may be made without departing from the scope of the present invention, which is to be defined by the appended claims.

What is claimed is:

1. A system for detecting driver drowsiness in an automotive vehicle, comprising:
   (a) a first sensor means for detecting rotation of a steering wheel of the vehicle and outputting a pulse whenever the steering wheel is rotated through a predetermined angle, said pulse indicating the rotational direction of the steering wheel;
   (b) a second sensor means for detecting the speed of the vehicle and outputting a signal according to the speed of the vehicle;
   (c) a first determination means for determining whether the number of pulses produced by said first sensor means within a time interval of a first duration exceeds a first reference value when the vehicle speed detected by said second sensor means exceeds a first, low, predetermined value of speed;
   (d) a second determination means for determining whether the number of steering reversals within a time interval of said first duration, each steering reversal being detected as a change in the rotational direction between two consecutive pulses, is below a second reference value when the vehicle speed detected by said second sensor means exceeds said first, low, predetermined value of speed; and
   (e) an alarm means for producing an alarm when said first determination means determines that the number of pulses produced within a time interval of said first duration exceeds said first reference value and when said second determination means determines that the number of steering reversals within a time interval of said first duration is below said second reference value.

2. The system of claim 1, wherein said first determination means comprises a first reference value setting means for setting said first reference value according to an average number of pulses produced by said first sensor means within a fixed data sampling period, said average number of pulses being calculated from a plurality of pulse counts, each being counted during a time interval of said first duration.

3. The system of claim 2, further including means for starting said fixed data sampling period after the vehicle speed sensed by said second sensor means is detected to be above a second, high, predetermined value of speed, said second, high, predetermined value of speed being slightly higher than said first, low, predetermined value of speed, and the vehicle speed is detected to be above said first, low, predetermined value of speed for a time interval of a second duration.

4. The system of claim 2, wherein said first reference value setting means does not count pulses produced by said first sensor means within a time interval of said first duration when a first predetermined number of consecutive pulses indicating the same rotational direction of the steering wheel are produced.

5. The system of claim 2, comprising means for inhibiting said first reference value setting means from operating when the number of pulses produced by said first sensor means within a time interval of said first duration exceeds a second predetermined number.

6. The system of claim 2, including means for setting said first reference value to the sum of said average number of pulses produced by said first sensor means within said fixed data sampling period and a first constant number.

7. The system of claim 1, including means for setting said second reference value to a second constant number.

8. The system of claim 2, including means operable for setting said second reference value by determining a difference between the pulse count within each first duration time interval and the number of steering reversals within said first duration time interval during said fixed data sampling period and, for every time interval of said first duration, operable for subtracting the maximum value of the calculated differences from the pulse count therefor and decremented by one.

9. A method for detecting driver drowsiness automotive vehicle, comprising the steps of:
   (a) determining whether the vehicle speed exceeds a lower predetermined value of speed;
   (b) determining whether a number of pulses within a time interval of a first duration exceeds a first reference value, each of the pulses being produced whenever a steering wheel of the vehicle is rotated through a predetermined angle while the vehicle speed exceeds said lower predetermined value of speed determined in said step (a), each pulse indicating the direction of rotation of the steering wheel;
   (c) while the vehicle speed exceeds said lower predetermined value of speed, determining whether a number of steering reversals within a time interval of said first duration is below a second reference value, each steering reversal being detected when one of said pulses and the subsequent pulse are derived from different rotational directions of the steering wheel; and (d) producing an alarm when the number of pulses within a time interval of said first duration exceeds said first reference value determined in said step (b) and the number of steering reversals within said time interval of said first duration is below said second reference value determined in said step (c).

10. The method of claim 9, wherein said step (b) includes the step of setting said first reference value according to an average number of said pulses within a fixed data sampling period, said average number of the pulses being calculated from the number of said pulses counted during time intervals of said first duration.

11. The method of claim 10, which further comprises the following steps before step (a):

(e) waiting until the vehicle speed exceeds a higher predetermined value of speed, said higher predetermined value of speed being slightly higher than said lower predetermined value of speed; and (f) waiting until an interval of time of a second duration has passed from the time when the vehicle speed exceeds said lower predetermined value of speed.

12. The method of claim 10, wherein in said setting step of said step (b), the number of said pulses within a time interval of said first duration is not counted when a first predetermined number of consecutive pulses derived from the same rotational direction of the steering wheel are produced.

13. The method of claim 10, wherein said step (c) comprises the steps of (h) calculating a difference between the number of said pulses during each first duration time interval and the number of said steering reversals during said first duration time interval during said fixed data sampling period; and (i) subtracting the maximum value of the calculated differences from the pulse count during each of said first duration time intervals, decremented by one.

14. A method for detecting driver drowsiness in an automotive vehicle, comprising the steps of:

(a) determining whether a number of pulses within a first duration interval of time exceeds a first reference value, each of the pulses being produced whenever a steering wheel of the vehicle is rotated through a predetermined angle, each pulse indicating the direction of rotation of the steering wheel;

(b) determining whether the number of steering reversals within a first duration interval of time is below a second reference value, each steering reversal being detected when one of said pulses and the subsequent pulse thereto are derived from different rotational directions of the steering wheel; and (c) producing an alarm when the number of pulses within a first duration interval of time exceeds said first reference value determined in said step (a) and the number of steering reversals within said first duration interval of time is below said second reference value determined in said step (b).

* * * * *